(No Model.) 2 Sheets—Sheet 2.
S. SAUNDERSEN.
WINDMILL.
No. 544,594. Patented Aug. 13, 1895.
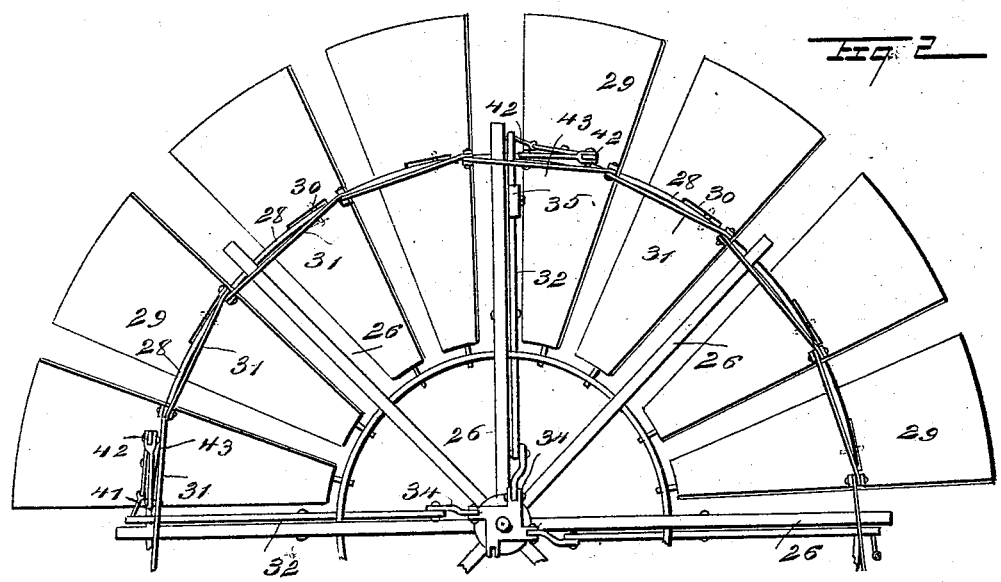
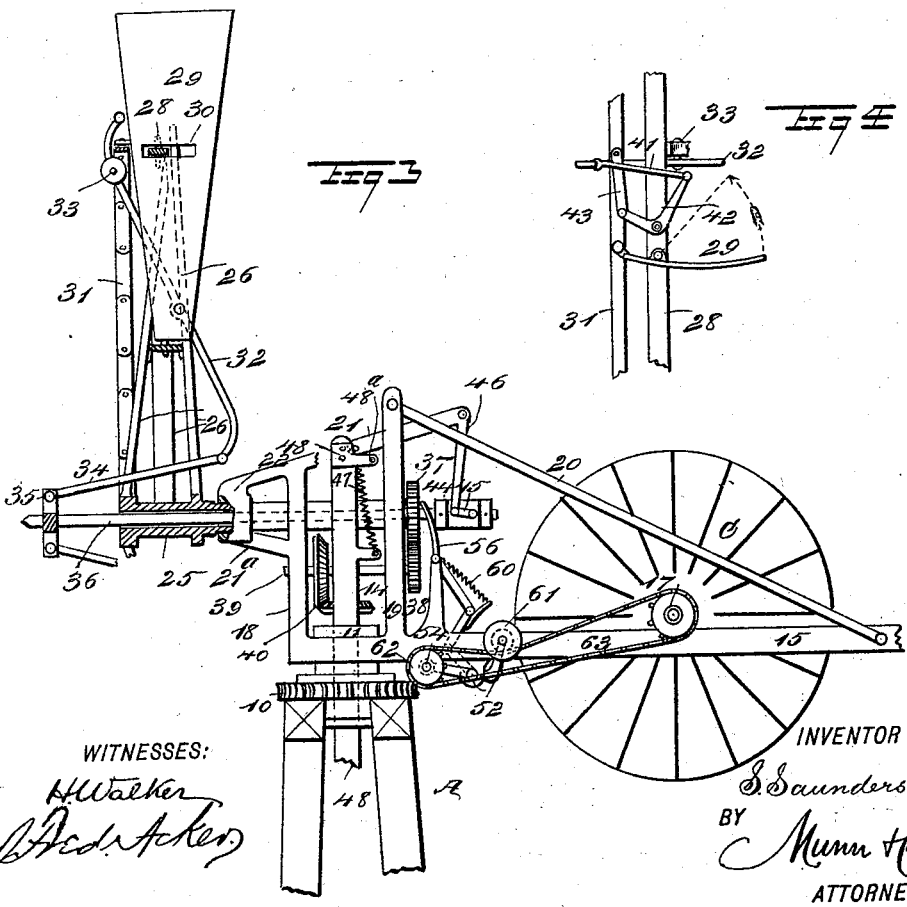
WITNESSES:
INVENTOR
S. Saundersen
BY
Munn & Co
ATTORNEYS.

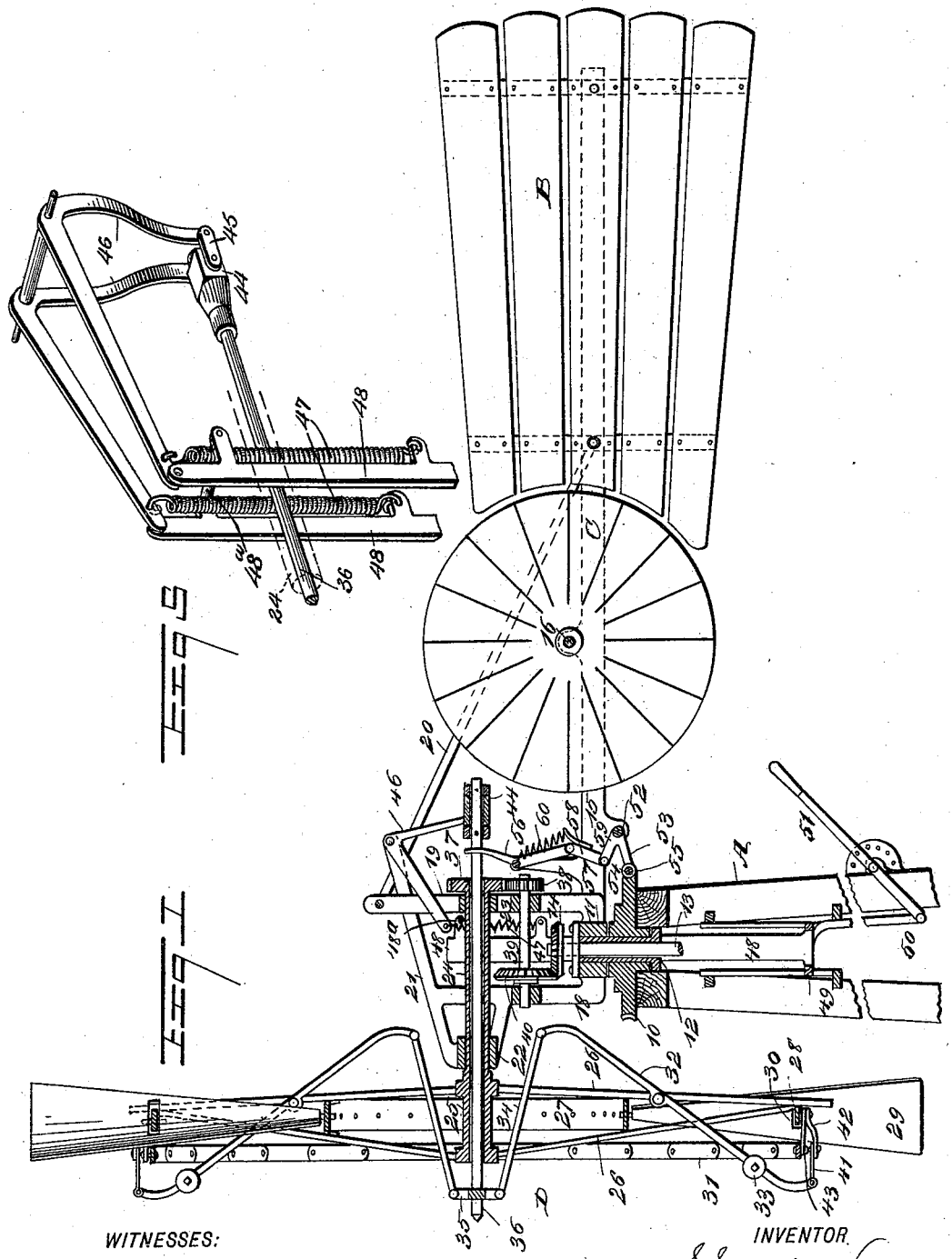

UNITED STATES PATENT OFFICE.

SAUNDER SAUNDERSEN, OF NORTHWOOD, NORTH DAKOTA.

WINDMILL.

SPECIFICATION forming part of Letters Patent No. 544,594, dated August 13, 1895.

Application filed July 11, 1894. Serial No. 517,189. (No model.)

*To all whom it may concern:*

Be it known that I, SAUNDER SAUNDERSEN, of Northwood, in the county of Grand Forks and State of North Dakota, have invented a new and Improved Windmill, of which the following is a full, clear, and exact description.

My invention relates to an improvement in windmills; and it has for its object to so construct the windmill that in operation it will maintain an even motion and be governed by the pressure of the wind upon the paddles of the wind-wheel, the force being applied in such a manner that when the wind blows strongly the paddles will be forced perpendicularly edgewise to the wind and sufficient of the wind be spilled to prevent the wind-wheel being revolved too fast, and, furthermore, in the event the wind should blow exceedingly strongly when the mill is in gear the paddles will be forced edgewise to the wind, affording open passage for the wind through the wheel, the same as though the mill were out of gear.

Another object of the invention is to provide a simple mechanism whereby the wind-wheel may be stopped from the ground or its speed slackened, and whereby also an auxiliary wind-wheel is provided at the tail of the mill, which will automatically act to carry the main wheel into the wind should the wind shift.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a central vertical section through the wind-wheel and the entire upper portion of the mill, illustrating the wind-wheel in the wind. Fig. 2 is a partial front elevation of the wind-wheel. Fig. 3 is a partial side elevation of the upper portion of the windmill and a sectional view of the wind-wheel, the latter being out of the wind. Fig. 4 is a detail view of a portion of the periphery of the wind-wheel, illustrating one of the blades or paddles in position to be out of the wind, and likewise illustrating the shifting mechanism controlling said blades or paddles; and Fig. 5 is a detail perspective view showing the shifting-bars and their connection with the sliding rod.

In carrying out the invention a tower A is provided of any suitable or approved construction, the tower having secured upon its upper end a worm-wheel 10, and upon this wheel a turn-table 11 is held to revolve, being provided with a sleeve, which extends downward through the worm-wheel. The driving-shaft 13 is passed down through the turn-table and sleeve to any desired point in the tower and is provided at its upper end with a beveled gear 14. Arms 15, adapted to form the frame of the tail of the mill, are projected horizontally from the turn-table, the said arms being made to converge at their outer ends, and between the outer extremities of these arms the tail B is secured, while an auxiliary wind-wheel C is journaled upon the said arms 15 in front of the tail, its shaft 16 being provided upon one end with a sprocket-wheel 17 or the equivalent thereof.

A framework is erected upon the turn-table and said framework may be made as shown in the drawings, in which it consists of two pairs of standards 18 and 19, corresponding standards of each pair being connected by an upper cross-bar 21 and an intermediate bar, if desired, the upper cross-bars 21 being provided with returns 21ᵃ at their forward ends.

Between the returns 21ᵃ of the frame a box 22 is secured, a similar box 23 being located between the rear standards 19, and in these two boxes a hollow shaft 24 is journaled, which is the wind-wheel shaft or the main driving-shaft of the mill, and the hub 25 of the wind-wheel D, which is hollow, may constitute a continuation of this shaft or may be attached thereto, as in practice is found most desirable. Spokes 26 are projected from opposite ends of the hub of the wheel D, the spokes being made to meet at their outer ends, and they are secured together at that point. In the further construction of the wheel an inner band or ring 27 is secured between the spokes concentric with the hub, and a peripheral band or ring 28 is attached to the outer ends of the spokes, as is best shown in Fig. 1. The paddles or blades 29 are beveled longitudinally at their side edges, whereby they are narrower at their inner than at their outer ends, and transversely these blades or paddles are concave upon their outer faces and convexed upon their inner faces. The inner ends of the blades or paddles are pivoted in the inner ring 27 of the wheel, while at or near the center of said paddles or blades an opening 30 is produced, through which the peripheral band 28 of the wheel passes, the blades or paddles being pivotally connected with this band. In this manner the angle of their movement upon their pivots is limited.

Links 31 are pivotally connected with the front edges of the paddles or blades adjacent to their pivotal connection with the outer rim of the wheel, and these links are all pivotally connected, forming an annular chain extending around the wheel concentric with its outer rim. Four or more, preferably four, regulating-arms 32 are fulcrumed at or near their centers upon the spokes. These arms are preferably located at predetermined intervals apart, and diametrically-opposing arms or all of the arms may be provided with weights 33 near their outer ends. These arms extend forward and rearward of the wheel, being forwardly curved at their rear ends and rearwardly curved at their forward ends. The rear ends of the arms 32 are connected by links 34 with a spider 35, the said spider being secured upon a shifting-rod 36, mounted to slide in the hub of the wind-wheel D and the hollow shaft 24. This shifting-rod extends forwardly beyond the wheel and rearwardly beyond the said shaft.

It may here be remarked that a gear 37 is secured upon the rear end of the hollow shaft 24, which meshes with a gear 38, located upon a shaft 39, provided with a beveled gear 40, meshing with the gear 14 of the driving-shaft 13.

The forward or weighted ends of the regulating-arms 32 are connected by links 41 with bell-crank or elbow levers 42, fulcrumed upon the peripheral band of the wind-wheel D, and these levers are connected by links 43 with the chain of links 31, pivotally connected with the blades or paddles, as is shown in detail in Fig. 4.

A head-block 44 is secured upon the rear end of the shifting-rod 36, connected by links 45 with elbow-levers 46, journaled preferably between the rear end portions of the upper cross-bars 21 of the main frame of the machine. These levers are connected with springs 47, and the springs 47 are carried downward and attached to offsets upon shifting-bars 48, the two bars being connected by a rod 48ª, the rod being so located that when the shifting-rods are pushed upward the connecting-bar 48ª will strike the forward ends of the elbow-levers 46 and carry said ends upward, thus carrying forward the shifting-bar 36 and causing the arms 32 to act upon the blades or paddles in a manner to feather them or present their edges to the wind, thus stopping the wind-wheel. These shifting-bars 48 extend downward in the tower and are attached usually to a ring 49, having guided movement, and this ring is connected by a rod 50 usually with a shifting-lever 51.

In front of the auxiliary wind-wheel C at the tail of the machine a shaft 52 is journaled, connected by arms 53 with a second shaft 54, and this latter shaft carries a worm 55 to engage with the worm-wheel 10. A lever 56 is journaled between extensions 57 from the frame 15 of the tail, as shown in Figs. 1 and 3, and the said lever is somewhat of an angled construction, its upper end being forked to receive the shifting-rod 36 and to be engaged by the head-block 44 of said rod. A link 58 connects the lower end of the lever 56 with a crank-arm 59, projected forwardly from the shaft 52, and a spring 60 is attached to the lever 56 and the link 58, to which it is secured. Thus it will be observed that when the shifting-rod 36 is pushed outward or forward the head-block 44 will press forward the upper end of the lever 56 and cause the crank-arm 59 to elevate the shaft 55, carrying the worm, and disengage it from the worm-wheel 10. One end of the rock-shaft 52 is carried outward outside of the frame of the tail, as shown in Fig. 3, and a pulley 61 is journaled thereon, a sprocket-wheel 62 being secured to the same end of the shaft 54, and the sprocket-wheel 62 is connected with the sprocket-wheel 17 of the auxiliary wind-wheel C by a belt 63, with which the pulley 61 engages. Thus when the worm is carried upward from the worm-wheel 10 the auxiliary wheel C will not have any influence upon the machine; but if the worm-wheel is carried to an engagement with the worm and the wind should shift the small wheel C will revolve and in revolving will gradually turn the body of the machine upon the tower by its engagement with the tower-wheel 10, and in this manner in a short time the main wheel will be brought up into the wind.

In the operation of the windmill, in the event the wind-wheel should be traveling too fast the centrifugal motion will cause the weighted ends of the regulating-arms 32 to act as governors and operate upon the elbow-levers 42 of the wind-wheel in a manner to shift the links 31 and compel the blades or paddles to feather, or practically so, and at the same time the opposite ends of the regulating-arms will have carried outwardly the shifting-rod 36 sufficiently to cause the head-block carried by said rod to act upon the shifting-lever 56 of the rotating mechanism governed by the small wheel C and carry said mechanism out of gear with the tower-wheel 10, thus permitting the entire body to turn, as occasion shall demand. In the event the wind should blow too strong—or, for example, in a strong sudden gust—its action upon the blades or paddles will be to turn them edge to the wind, and in so doing all of the mechanism just described will be operated in the same manner, and when pressure is removed from the blades, since in turning they place the springs 47 under tension, the springs 47 will act to turn the blades and their mechanism to their normal positions. In the event the wheel is to be shifted from the ground the shifting-bars 48 are simply pushed upward, whereupon the said bars will act directly upon the shifting elbow-levers 46 and upon the regulating-rod 36 to force the latter outward, thereby placing the blades or paddles edge to the wind and throwing the small tail-wheel C out of engagement with the tower-wheel 10.

The auxiliary wind-wheel and its worm connection with the tower will prevent the machine from whirling, which is a great trouble with tower-mills in an uneven wind, and takes the place of the lock usually employed.

Having thus described my invention, I claim as new and desire to secure by Letters Patent—

1. In a wind mill, a wind wheel, blades radially pivoted in the said wheel, connecting links pivotally connected with the blades, levers fulcrumed upon the wheel and connected with the links, shifting arms connected with the said levers, and a spring-controlled shifting bar connected with the said arms, as and for the purpose specified.

2. In a wind mill, the combination, with a wind wheel, blades radially pivoted therein, the outer pivot being at the rim of the wheel which passes through the blades, connected links pivotally connected with the blades, and shifting levers connected with the said links, of shifting arms weighted at their outer ends and extending through the wheel, one end of the said arms being connected with said shifting levers, a spring-controlled shifting bar connected with the shifting arms, and a means for rotating the wheel supporting frame, said means being shifted through the medium of the said shifting bar, as and for the purpose specified.

3. In a wind mill, the combination with a frame mounted to revolve and provided with a worm wheel, a wind wheel mounted in said frame and provided with pivoted blades, and a shifting mechanism for said blades, of an auxiliary wheel, a worm engaging the worm wheel of the said frame, a rock shaft by which the worm is carried, a pivoted lever operated by the said shifting mechanism, a link connecting the said lever with the rock shaft, and means for operating the worm from the auxiliary wheel, substantially as described.

4. In a wind mill, the combination with a frame mounted to revolve and provided with a worm wheel, a wind wheel mounted in the frame and provided with pivoted blades, and a shifting mechanism for said blades, of an auxiliary wheel, a rock shaft provided with arms, a worm carried by one of the arms of the rock shaft, a pivoted lever operated by the shifting mechanism, a link pivoted to the said lever and to one arm of the rock shaft, a spring connected to said arm and link, and means for operating the worm from the auxiliary wheel, substantially as described.

5. In a wind mill, the combination, with the tower, a wind wheel provided with radially pivoted blades connected by a chain of links, shifting levers supported upon the wheel and connected with the links, shifting arms extending through the wheel, pivoted thereon and connected with the shifting levers, the tower being provided with an attached gear, and a shifting rod connected with the shifting arms, of a spring-controlled shifting mechanism connected with the said shifting bar, an auxiliary wind wheel journaled in the tail of the machine, a gear engaging with the tower wheel, a trip connection between the gear and the shifting bar, and a driving mechanism between the said gear meshing with the tower wheel and the auxiliary wind wheel, as and for the purpose specified.

6. In a wind mill, the combination, with the tower, a wind wheel provided with radially pivoted blades connected by a chain of links, shifting levers supported upon the wheel and connected with the links, shifting arms extending through the wheel, pivoted thereon and connected with the shifting levers, a tower provided with an attached gear, and a shifting rod connected with the shifting arms, of a spring-controlled shifting mechanism connected with the said shifting bar, an auxiliary wind wheel journaled in the tail of the machine, a gear engaging with the tower wheel, a trip connection between the gear and the shifting bar, a driving mechanism between the said gear meshing with the tower wheel and the auxiliary wind wheel, and shifting rods capable of being operated from the ground and having connection with the shifting bar operated from the main wheel, as and for the purpose set forth.

7. In a wind mill, the combination with a wind wheel provided with pivoted blades, a rod sliding in the hub of the wheel, and a connection between the said rod and blades for operating the blades from the said rod, of vertically sliding shifting bars, pivoted elbow levers, links connecting one arm of the levers with the sliding rod, springs connecting the other arms of the elbow levers with the shifting bars, and means for operating said shifting bars, substantially as described.

SAUNDER SAUNDERSEN.

Witnesses:
CHAS. GUSTAFSON,
O. B. SATHER.